US008645837B2

(12) United States Patent
Little

(10) Patent No.: US 8,645,837 B2
(45) Date of Patent: Feb. 4, 2014

(54) GRAPHICAL USER INTERFACE FOR MANAGING SERVICES IN A DISTRIBUTED COMPUTING SYSTEM

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1015 days.

(21) Appl. No.: 12/324,774

(22) Filed: Nov. 26, 2008

(65) Prior Publication Data

US 2010/0131854 A1   May 27, 2010

(51) Int. Cl.
*G06F 15/177*   (2006.01)
(52) U.S. Cl.
USPC ........... 715/735; 715/734; 715/736; 717/174; 717/103; 717/105; 717/177
(58) Field of Classification Search
USPC .......... 715/735, 734, 736, 738; 717/103, 105, 717/174, 176, 177, 178
See application file for complete search history.

(56) References Cited

U.S. PATENT DOCUMENTS

| 5,953,532 | A * | 9/1999 | Lochbaum ............... 717/176 |
|---|---|---|---|
| 6,151,608 | A | 11/2000 | Abrams |
| 6,226,792 | B1 | 5/2001 | Goiffon et al. |
| 6,256,675 | B1 | 7/2001 | Rabinovich |
| 6,622,259 | B1 | 9/2003 | Schmuck |
| 6,810,259 | B1 | 10/2004 | Zhang |
| 7,065,637 | B1 | 6/2006 | Nanja |
| 7,080,078 | B1 | 7/2006 | Slaughter et al. |
| 7,124,320 | B1 | 10/2006 | Wipfel |
| 7,159,224 | B2 | 1/2007 | Sharma et al. |
| 7,185,342 | B1 | 2/2007 | Carrer et al. |
| 7,464,147 | B1 | 12/2008 | Fakhouri et al. |
| 7,627,671 | B1 | 12/2009 | Palma et al. |
| 7,730,172 | B1 | 6/2010 | Lewis |
| 7,912,945 | B2 | 3/2011 | Little |
| 8,160,913 | B2 * | 4/2012 | Simons et al. ............... 705/7.23 |
| 8,209,272 | B2 | 6/2012 | Little |
| 8,464,270 | B2 | 6/2013 | Little |
| 2002/0007468 | A1 | 1/2002 | Kampe et al. |
| 2002/0052884 | A1 | 5/2002 | Farber et al. |
| 2002/0091746 | A1 | 7/2002 | Umberger et al. |
| 2002/0107949 | A1 | 8/2002 | Rawson |
| 2002/0129346 | A1 | 9/2002 | Lee et al. |
| 2002/0156893 | A1 | 10/2002 | Pouyoul et al. |

(Continued)

OTHER PUBLICATIONS

"JBossESB Requirements and Architecture, Version: 0.3," May 2, 2006, 12 pages.

(Continued)

*Primary Examiner* — Weilun Lo
*Assistant Examiner* — Rashedul Hassan
(74) *Attorney, Agent, or Firm* — Lowenstein Sandler LLP

(57) ABSTRACT

Available components that make up a distributed computing system are discovered. The available components include available hardware components and available software components that operate on the available hardware components. The available components and dependencies between the available components are graphically displayed in a map of the distributed computing system. A plurality of undeployed services is also graphically displayed. A selection of one of the plurality of undeployed services and a selection of one of the available components is received. The selected undeployed service is deployed to the selected available component.

18 Claims, 7 Drawing Sheets

(56) References Cited

U.S. PATENT DOCUMENTS

| | | | |
|---|---|---|---|
| 2002/0178254 A1* | 11/2002 | Brittenham et al. | 709/224 |
| 2003/0009545 A1 | 1/2003 | Sahai et al. | |
| 2003/0018780 A1 | 1/2003 | Kawashima | |
| 2003/0046615 A1 | 3/2003 | Stone | |
| 2003/0182427 A1 | 9/2003 | Halpern | |
| 2003/0184595 A1* | 10/2003 | Kodosky et al. | 345/810 |
| 2003/0192028 A1 | 10/2003 | Gusler et al. | |
| 2004/0064543 A1 | 4/2004 | Ashutosh et al. | |
| 2004/0064548 A1 | 4/2004 | Adams et al. | |
| 2004/0068637 A1 | 4/2004 | Nelson et al. | |
| 2004/0133611 A1 | 7/2004 | Cabrera et al. | |
| 2004/0143830 A1* | 7/2004 | Gupton et al. | 717/174 |
| 2004/0148185 A1* | 7/2004 | Sadiq | 705/1 |
| 2004/0255291 A1* | 12/2004 | Sierer et al. | 717/174 |
| 2005/0010919 A1 | 1/2005 | Ramanathan et al. | |
| 2005/0071470 A1 | 3/2005 | O'Brien et al. | |
| 2005/0119905 A1 | 6/2005 | Wong et al. | |
| 2005/0120092 A1 | 6/2005 | Nakano et al. | |
| 2005/0172306 A1 | 8/2005 | Agarwal et al. | |
| 2005/0198450 A1 | 9/2005 | Corrado et al. | |
| 2005/0235248 A1 | 10/2005 | Victoria et al. | |
| 2006/0005162 A1 | 1/2006 | Tseng et al. | |
| 2006/0106590 A1 | 5/2006 | Tseng et al. | |
| 2006/0190527 A1 | 8/2006 | Neil et al. | |
| 2006/0218266 A1 | 9/2006 | Matsumoto et al. | |
| 2006/0218272 A1 | 9/2006 | Murakami | |
| 2006/0242292 A1 | 10/2006 | Carter | |
| 2007/0180436 A1 | 8/2007 | Travostino et al. | |
| 2007/0233671 A1 | 10/2007 | Oztekin et al. | |
| 2007/0240143 A1 | 10/2007 | Guminy et al. | |
| 2007/0294577 A1 | 12/2007 | Fiske | |
| 2008/0059746 A1 | 3/2008 | Fisher | |
| 2008/0071748 A1 | 3/2008 | Wroblewski et al. | |
| 2008/0141170 A1* | 6/2008 | Kodosky et al. | 715/810 |
| 2008/0263559 A1 | 10/2008 | Das et al. | |
| 2008/0300851 A1 | 12/2008 | Chakrabarti et al. | |
| 2009/0037573 A1 | 2/2009 | Qiu et al. | |
| 2009/0141635 A1 | 6/2009 | Little | |
| 2010/0146396 A1* | 6/2010 | Able et al. | 715/735 |

OTHER PUBLICATIONS

King, Erik, "Perpetual Enterprise Management Service (PEMS) for Next Generation SOA-based Command & Control Systems", Jun. 2005, 49 pages.

Oasis, "Web Services Context Specification (WS-Context)," OASIS Committee draft version 0.8, Version created Nov. 3, 2004, Editors, Mark Little, et al., Copyright © 2004 The Organization for the Advancement of Structured Information Standards [Appendix A], pp. 1-23.

Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.

"Why ESB and SOA?" Version 0.3, Date: Jan. 27, 2006, 7 pages.

Hewlett-Packard Development Company, L.P., "HP Network Node Manager Advanced Edition 7.53 Data sheet", Jun. 2008, 7 pages.

Franz Huber, et al., "Tool supported Specification and Simulation of Distributed Systems", Institut für Informatik, Technische Universität München, 1998, 10 pages, München.

USPTO Office Action for U.S. Appl. No. 11/998,702 mailed Sep. 27, 2011.

USPTO Office Action for U.S. Appl. No. 11/998,702 mailed May 11, 2011.

Office Action for U.S. Appl. No. 11/998,717 mailed Apr. 4, 2011.

Notice of Allowance for U.S. Appl. No. 11/998,561 mailed Nov. 12, 2010.

Office Action for U.S. Appl. No. 11/998,561 mailed Aug. 3, 2010.

Office Action for U.S. Appl. No. 11/998,561 mailed Feb. 17, 2010.

Office Action for U.S Appl. No. 11/998,717 mailed Oct. 15, 2010.

Office Action for U.S. Appl. No. 11/998,717 mailed Oct. 5, 2011.

USPTO Office Action for U.S. Appl. No. 11/998,702 mailed Sep. 20, 2012.

USPTO Notice of Allowance U.S. Appl. No. 11/998,702 mailed Feb. 11, 2013.

USPTO Notice of Allowance for U.S. Appl. No. 12/395,459 mailed Feb. 28, 2012.

USPTO Office Action for U.S.Appl. No. 12/395,459 mailed Oct. 20, 2011.

* cited by examiner

GRAPHICAL USER INTERFACE FOR MANAGING SERVICES IN A DISTRIBUTED COMPUTING SYSTEM

TECHNICAL FIELD

Embodiments of the present invention relate to distributed systems, and more specifically to a graphical user interface for managing services in a distributed system.

BACKGROUND

Distributed computing systems include multiple distinct services. Each service may be independent of other services, and may be accessed without knowledge of its underlying platform implementation. Each service typically operates on an application server such as a Java virtual machine.

In conventional distributed computing systems, to install a new service on a particular application server, an administrator needs to log in to the machine hosting that application server, and manually install the service thereon using a command line interface. Moreover, the administrator typically needs to personally know what machines are on the distributed system and the capabilities of those machines. This makes installing new services on the distributed computing system time consuming and error prone.

BRIEF DESCRIPTION OF THE DRAWINGS

The present invention is illustrated by way of example, and not by way of limitation, in the figures of the accompanying drawings and in which.

DETAILED DESCRIPTION

Figure 1:
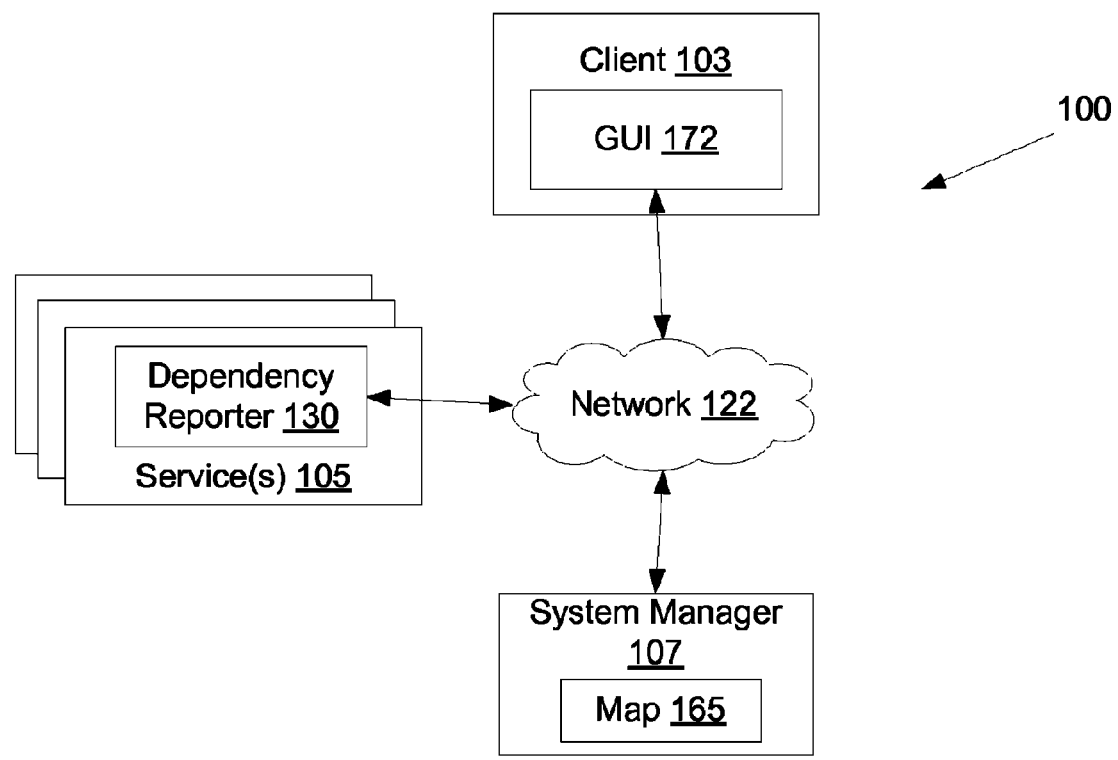
FIG. 1 illustrates an exemplary distributed computing system, in which embodiments of the present invention may operate.

Described herein is a method and apparatus for managing services in a distributed computing system using a graphical user interface. In one embodiment, available components that make up a distributed computing system are discovered. The available components include available hardware components and available software components that operate on the available hardware components. The available components and dependencies between the available components are graphically displayed in a map of the distributed computing system. One or more undeployed services are also graphically displayed. The undeployed services and the available components may be displayed as icons in different regions of a graphical user interface. A selection of one of the plurality of undeployed services and a selection of one of the available components is received. These selections may be received based on mouse commands. For example, a user may click on an icon representing an undeployed service and drag it to an icon representing an available component. The selected undeployed service is deployed to the selected available component.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "determining", "indicating", "receiving", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients (e.g., client 103) and services 105, connected via a network 122. The network 122 may be a public network (e.g., Internet), a private network (e.g., Ethernet or a local area Network (LAN)), or a combination thereof. In one embodiment, the network 122 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Client 103 may be, for example, a personal computer (PC), palm-sized computing device, personal digital assistant (PDA), etc. Client 103 may also be an application run on a PC, server, database, etc. In an SOA, client 103 includes an application that accesses services. Client 103 may be a fat client (client that performs local processing and data storage), thin client (client that performs minimal or no local processing and minimal to no data storage), or a hybrid client (client that performs local processing but little to no data storage).

In one embodiment, client 103 includes a graphical user interface (GUI) 172. Client 103 may use the GUI 172 to perform management activities such as adding services to the distributed computing system 100, removing services from the distributed computing system 100, migrating (moving) services between machines and/or application servers on the distributed computing system 100, etc. In one embodiment, the graphical user interface 172 communicates with a system manager 107 (discussed in greater detail below). The GUI 172 may receive user input to perform a management function on a component of the distributed computing system 100 and transmit the user input to system manger 107. System manager 107 may then perform the management function that is received from the GUI 172. Embodiments of the GUI 172 is described in greater detail below with reference to FIGS. 2A-2C.

Referring to FIG. 1, services 105 may be discretely defined sets of contiguous and autonomous functionality (e.g., business functionality, technical functionality, etc.). Services 105 may be resident on personal computers (PC), servers, routers, etc. Each service may represent a process, activity or other resource that can be accessed and used by other services or clients on network 122. Each service may be independent of other services, and may be accessed without knowledge of its underlying platform implementation.

In an example for a business function of "managing orders," services 105 may include, for example, create order, fulfill order, ship order, invoice order, cancel/update order, etc. Each such service may be autonomous from the other services that are used to manage orders, and may be remote from one another and have different platform implementations. However, the services 105 may be combined and used by one or more applications to manage orders.

Services 105 may be implemented using an object oriented programming (OOP) environment. In object oriented programming, a class represents an abstract data structure that provides a blueprint that specifies behaviors (methods) and state variables (fields). An object is an instance of a class that can be created (instantiated) by assigning values to the state variables. Each object can be viewed as an independent machine or actor with a distinct role or responsibility. In one embodiment, some services 105 are objects. Alternatively, services 105 may include multiple objects. Each object may include a method or methods, each of which performs a specific task or tasks for the object.

Services 105 may also be implemented using procedural programming, functional programming, or other programming methodologies. Such services may be and/or include functions, procedures, or other programming constructs.

In one embodiment, each of the services 105 includes a dependency reporter 130. In one embodiment, in which the services 105 are programmed using aspect oriented programming (AOP), the dependency reporter 130 includes an interceptor. An interceptor is logic that is triggered by a certain event or events, that can be inserted between a method invoker and a method (e.g., between a first service that invokes a second service) without modifying code of either. It should be noted that AOP is not mutually exclusive with other programming environments (e.g., OOP, procedural programming, etc.), and that AOP can be used in conjunction with such programming environments. In other embodiments, the dependency reporter 130 may be logic that is incorporated into the services by modifying code of the services 105. Alternatively, the dependency reporter 130 may be a program (e.g., an object, procedure, etc.) coupled to a service that tracks when the service is called by, or makes calls to, other services.

When the dependency reporter 130 detects that a service calls (invokes) another service, or is called by another service, it logs the identities of the service being called and the service making the call. The identity of a service may include, for example, a process identifier (e.g., a unique Java virtual machine (JVM) in Java, or a unique Unix process in C++ on Unix) of the service or of a process on which the service is running. The identity may also include an identification of an object, procedure, function, etc. running within a process. The identity may further include specific components of an object, procedure, function, etc. For example, in services constructed using OOP, the identity may include an object and/or a method within the object. In one embodiment, the dependency reporter 235 transmits detected invocations to the system manager 107.

System manager 107 is a service that installs, moves, deletes, etc. services and other software (e.g., application servers) in the distributed computing system 100. System manager 107 runs on a computer such as a server, or personal computer that is connected to the network 122. System manager 107 can perform system management functions automatically, or based on user input. In one embodiment, system manager 107 receives user input from a graphical user interface 172 that operates at client 103. Alternatively, system manager 107 may receive user input from a graphical user input that is installed on the system manager 107.

System manager 107 maintains a map 165 of the distributed computing system 100. The map 165 graphically shows available components and relationships between the available components. Such relationships may include physical relationships (e.g., machines that share the same location or power supply), service dependencies and/or other relationships. In one embodiment, system manager 107 stores the map on a data store (not shown).

In one embodiment, system manager 107 imposes an administrative view on the map 165. The administrative view allows the available components to be represented on the map 165 using human understandable component names, component types, and/or component descriptions. The administrative view may be imposed, for example, by determining a service type for each service, and applying a human understandable service name based on the service type. The component type and/or component name may be determined by querying the available component and/or by querying a registry on the distributed computing system 100. Alternatively, component types and/or component names may be input by a user of the system manager 107.

In one embodiment, system manager 107 uses a directory service to discover available components (e.g., available services, machines, data stores, application servers, etc.) on the distributed computing system 100. In another embodiment, available components are configured to send a status report to the system manager 107 when the component becomes available (e.g., when the component is started up). The available components may also periodically send status reports to the system manager at a predetermined time interval, or when information included in the last status report has changed. Status reports may identify characteristics of the available component such as name, component type (e.g., machine, service, application server, etc.), or other component properties. Alternatively, or in addition, system manager 107 may scan the distributed computing system 100 to discover available components using a communication protocol such as, for example, simple network management protocol (SNMP). The system manager 107 may also be preconfigured with component information.

System manager 107 gathers dependency information between services, of services to application servers, of services to hardware components, between hardware components, and so on. In one embodiment, system manager 107 uses received invocation reports, logs and/or a dependency database to identify service dependencies. These dependencies may be represented in the map 165.

Each invocation/call detected by a dependency reporter 130 represents a dependency, in which the service making the call is dependent upon the service being called. These dependencies can be tracked by system manager 107 by keeping an up-to-date status of service dependencies in map 165. System manager 107 may add a new dependency to, or update an existing dependency on, the map 165 each time a service is detected to invoke another service (or a specific method or object within another service). If it is the first time that the invoking service has called the invoked service, a new dependency may be added. Otherwise, an existing dependency may be updated.

It can be beneficial to track dependencies between services to gain an understanding of the needs of individual clients and services within the distributed computing system 100. The map 165 may be used, for example, to intelligently migrate services between locations within the distributed computing system 100, or to track most likely points of failure within the distributed computing system 100.

Figure 2A:
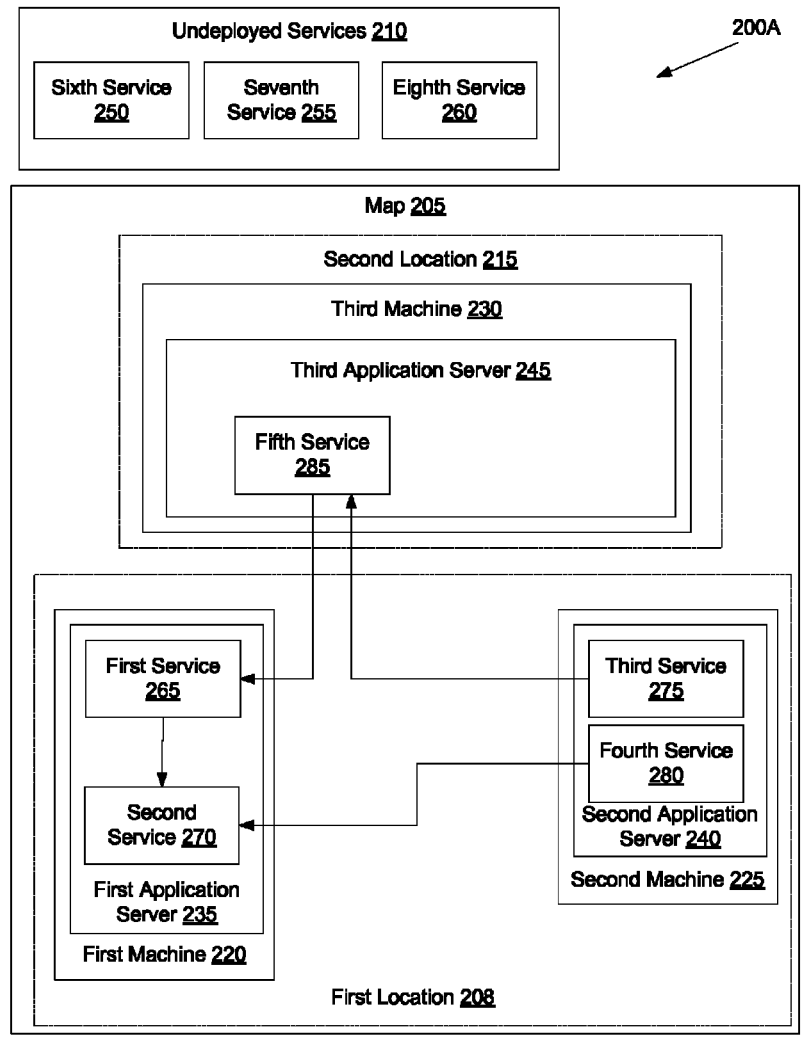
FIG. 2A illustrates a first view of an exemplary graphical user interface that includes a map and a collection of undeployed services, in accordance with one embodiment of the present invention.
Figure 2B:
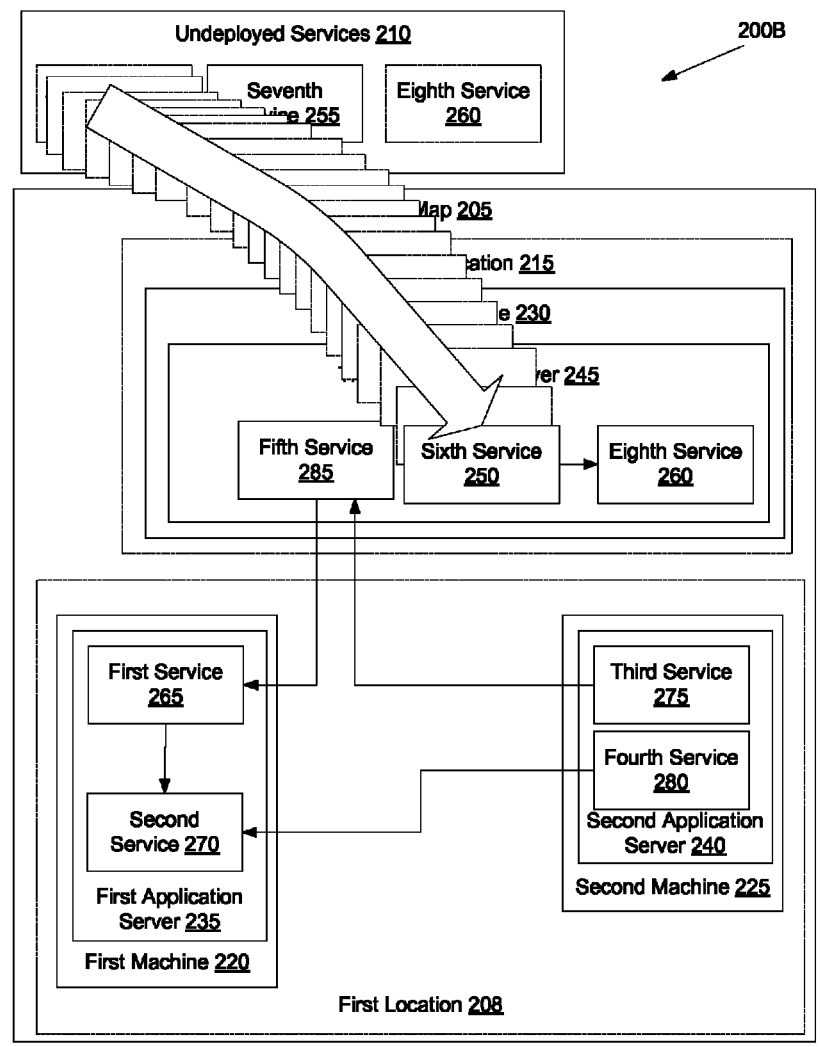
FIG. 2B illustrates a second view of the graphical user interface of FIG. 2A, in accordance with one embodiment of the present invention.
Figure 2C:
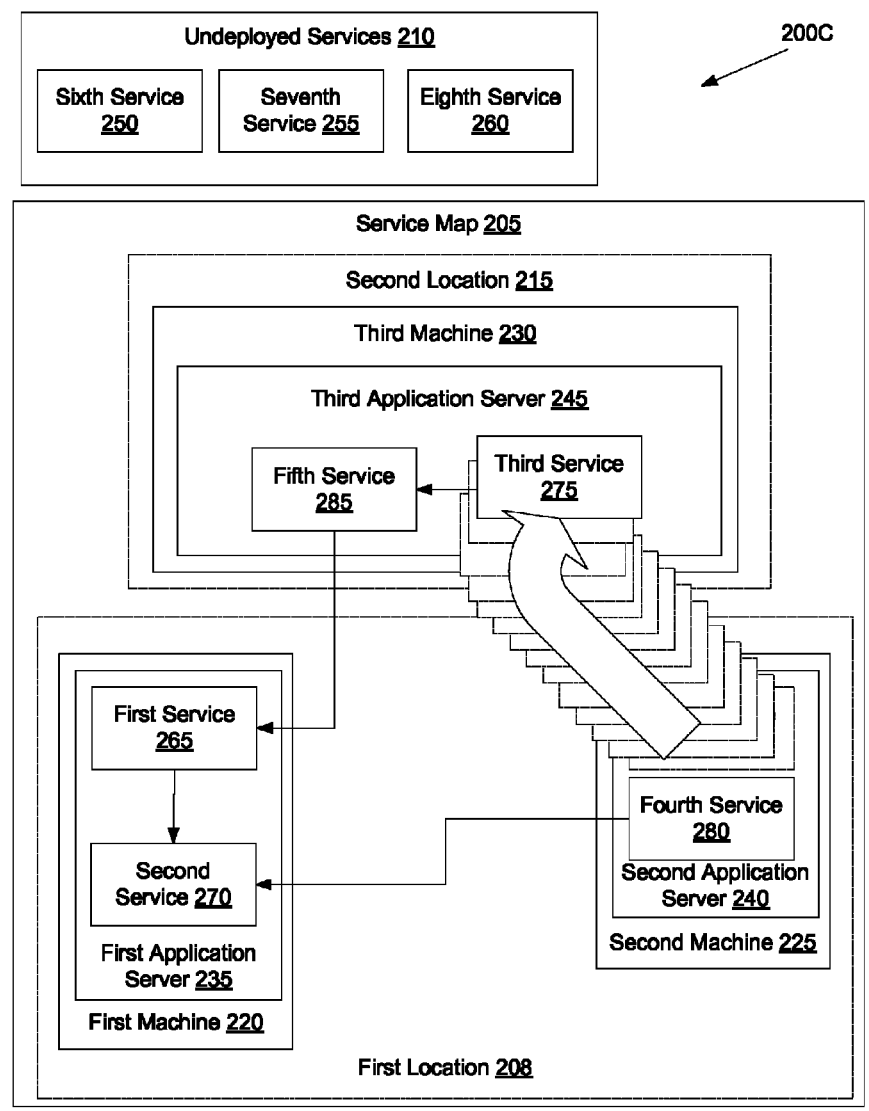
FIG. 2C illustrates a third view of the graphical user interface of FIG. 2A, in accordance with another embodiment of the present invention.

FIGS. 2A-2C illustrate different views of an exemplary graphical user interface (GUI) for managing services in a distributed computing system, in accordance with embodiments of the present invention. FIG. 2A illustrates a first view 200A of the graphical user interface that includes a map 205 and a collection of undeployed services 210. The map 205 graphically illustrates available components of the distributed computing system, including available hardware components (e.g., first machine 220, second machine 225 and third machine 230) and available software components (e.g., first service 165, second service 270, third service 275, fourth service 280, fifth service 285, first application server 235, second application server 240 and third application server 245). The map 205 also illustrates relationships such as physical relationships and dependencies between available components. For example, the map 205 shows that first machine 220 and second machine 225 are both located at a first location 208 and that third machine 230 is located at a second location 215. The map 205 also shows that first application server 235 operates on first machine 220, that second application server 240 operates on second machine 225 and that third application server 245 operates on third machine 230. Additionally, the map 205 shows that first service 265 and second service 270 operate on the first application server 235, that third service 275 and fourth service 280 operate on second application server 240, and that fifth service 285 operates on third application server 245. The map 205 may also show, for example, dependencies of machines to data stores, of machines to power supplies, and so on.

In one embodiment, map 205 shows dependencies between services. For example, map 205 shows that first service 265 depends on second service 270 using an arrow. Likewise, fourth service 280 depends on second service 270, third service 275 depends on fifth service 285, and fifth service 185 depends on first service 265. In a real world example, a travel agent service may be dependent upon a flight booking service and a hotel booking service. In turn, both the flight booking service and hotel booking service may be dependent upon a data store service and a credit card service. In one embodiment, a degree of dependency is illustrated by the thickness of the arrows, such that thicker arrows represent stronger dependencies. Alternatively, the degree of dependency between services may be represented by numerical dependency ratings or other graphical or textual representations of a dependency rating.

The collection of undeployed services 210 includes services (e.g., sixth service 250, seventh service 255 and eighth service 260) that can be deployed to the distributed computing system. Each of the undeployed services 210 may be a software installation package that includes multiple files bundled in an archive format for installation by a package management system or a self sufficient installer.

In one embodiment, each of the available components and each of the undeployed services 210 are represented by icons and/or names that uniquely identify those services and components. Available components of the same type may be represented by like icons, and differentiated based on names. Available components that operate on other available components may be shown as icons nested within additional icons representing the available components that they depend on. For example, separate icons for the first service 265 and second service 270 may be shown as nested within an icon representing the first application server 235, which in turn may be shown as nested within an icon representing the first machine 220. All types of available components may be shown in the map 205 at a single time. Alternatively, one or more levels of available components may be shown, with the other levels hidden. For example, only application servers may be illustrated, only machines may be illustrated, only services may be illustrated, etc.

In one embodiment, upon selection of an available component, additional information about the selected available component is displayed. For example, upon selection of a machine, the machines memory, installed operating system, number and speed of processors, etc. may be displayed. Selection of an undeployed service may cause system requirements of the undeployed service to be displayed. Moreover, upon selection of an undeployed service, those available components that meet the system requirements may be identified in the map 205. Additionally, those available components that do not currently meet the system requirements, but that would meet the system requirements if additional software was installed, may also be identified in the map 205.

In one embodiment, undeployed services 210 can be deployed to an available component of the distributed computing system by selecting an undeployed service 210 to deploy and an available component (e.g., first application server 235, second application server 240, etc) to deploy it to. Such selection may be performed, for example, by clicking on an undeployed service 210 via a mouse command, and dragging the undeployed service to an available component.

Referring to FIG. 2B, a second view 200B of the graphical user interface of FIG. 2A is shown in which the sixth service 250 is installed to the third application server 245. As illustrated, a user has used the graphical user interface to select the sixth service 250 and drag it to the third application server 245 to initiate deployment. Deployment may include, for example, downloading a package for the selected service to the selected available component, decompressing and installing the service, and configuring the service.

In some instances, a user may attempt to install a service that depends on unavailable components, such as unavailable services or unavailable application servers. If a user attempts to install such a service, those unavailable software components on which the selected service depends may also be installed. The unavailable software components may be deployed prior to deployment of the selected service, or concurrent to the selected service. In view 200B of the GUI, sixth service 250 depends on eighth service 260. Therefore, eighth service 260 has automatically been installed along with sixth service 250.

In addition to services being deployed via the graphical user interface, the graphical user interface may also be used to migrate (move) and/or delete already deployed services. Deployed services may be migrated between available components by selecting a deployed service to migrate and an available component to migrate it to.

Referring to FIG. 2C, a third view 200C of the graphical user interface of FIG. 2A is shown in which the fourth service 120 is migrated to the third application server 245. As illustrated in FIG. 2C, a user has used the graphical user interface to select the sixth service 250 and drag it to the third application server 245 to initiate migration.

When a service is to be migrated, the code and data that makes up the service is packaged. Packaging may include placing the code and data into a single file or folder, compressing the code and data, etc. The package is then uploaded to and installed at the new location (e.g., on a new machine and/or application server). Once the service has been successfully deployed to the new available component, the original version may be deleted.

Figure 3:
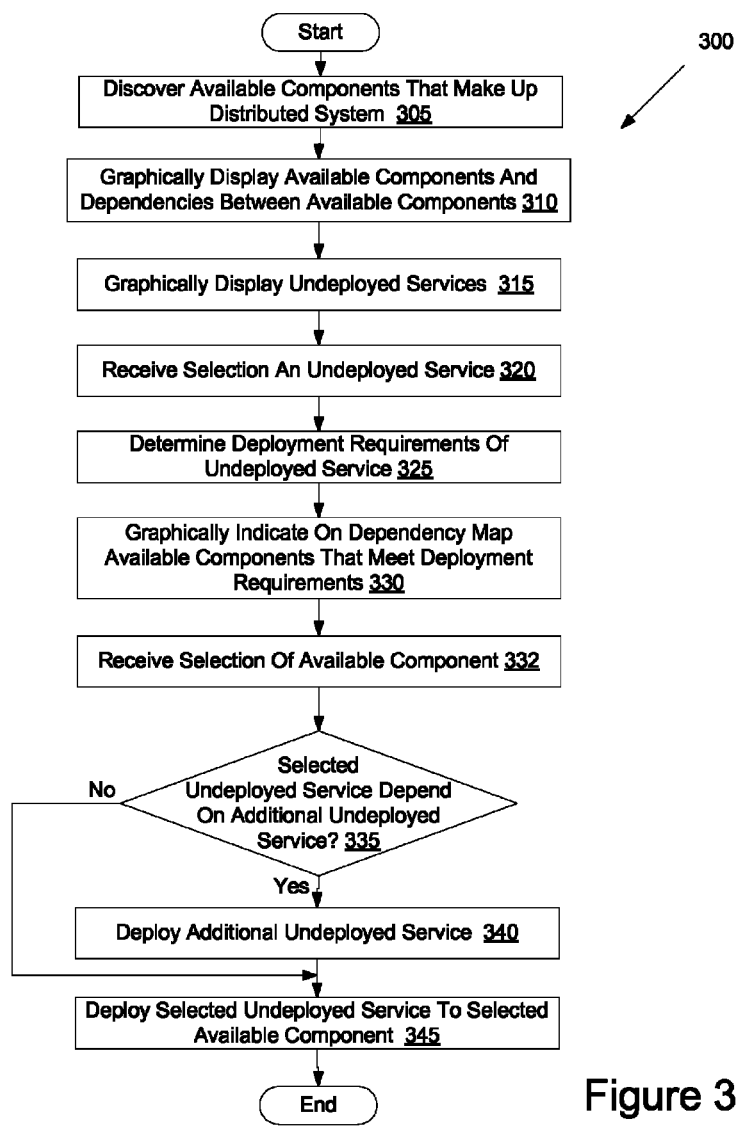
FIG. 3 illustrates a flow diagram of one embodiment for a method of managing dependencies in a distributed computing system.

FIG. 3 illustrates a flow diagram of one embodiment for a method 300 of managing dependencies in a distributed computing system. The method is performed by processing logic that comprises hardware (e.g., circuitry, dedicated logic, programmable logic, microcode, etc.), software (such as instructions run on a processing device), or a combination thereof. In one embodiment, method 300 is performed by graphical user interface 172 and/or system manager 107 of distributed computing system 100 of FIG. 1.

Referring to FIG. 3, at block 305 available components of a distributed computing system are discovered. The available components may be discovered using a directory service, using preconfigured component information, based on status reports received from the available components, and/or by scanning the distributed computing system (e.g., using SNMP). At block 310, a graphic user interface graphically displays available components and dependencies between available components. In one embodiment, the available components and relationships between the available components are shown via a map. At block 315, the graphic user interface graphically displays undeployed services. Available components and undeployed services may be displayed using icons and/or text.

At block 320, a selection of an undeployed service is received via the graphical user interface. At block 325, requirements of the selected undeployed service are determined. Examples of requirements include system requirements (e.g., processor speed, memory capacity, operating system, etc.) and software dependency requirements (e.g., a specific version of a Java virtual machine, additional services, etc.). At block 330, the graphical user interface graphically indicates on a map available components that meet the deployment requirements.

At block 332, a selection of an available component is received via the graphical user interface. Selection of the undeployed service and of the available component may be received via a mouse command. For example, a user may click on an undeployed service and drag it to an available component.

At block 335, a system controlled by the graphical user interface determines whether the selected undeployed service depends on any additional undeployed services. If the selected undeployed service does depend on an additional undeployed service, the method continues to block 340. Otherwise, the method proceeds to block 345.

At block 340, the additional undeployed service is deployed to the selected available component. At block 345, the selected undeployed service is deployed to the selected available component. In one embodiment, the additional undeployed service and the selected undeployed service are deployed concurrently. Alternatively, the additional undeployed service may be deployed before or after the selected undeployed service.

Figure 4:
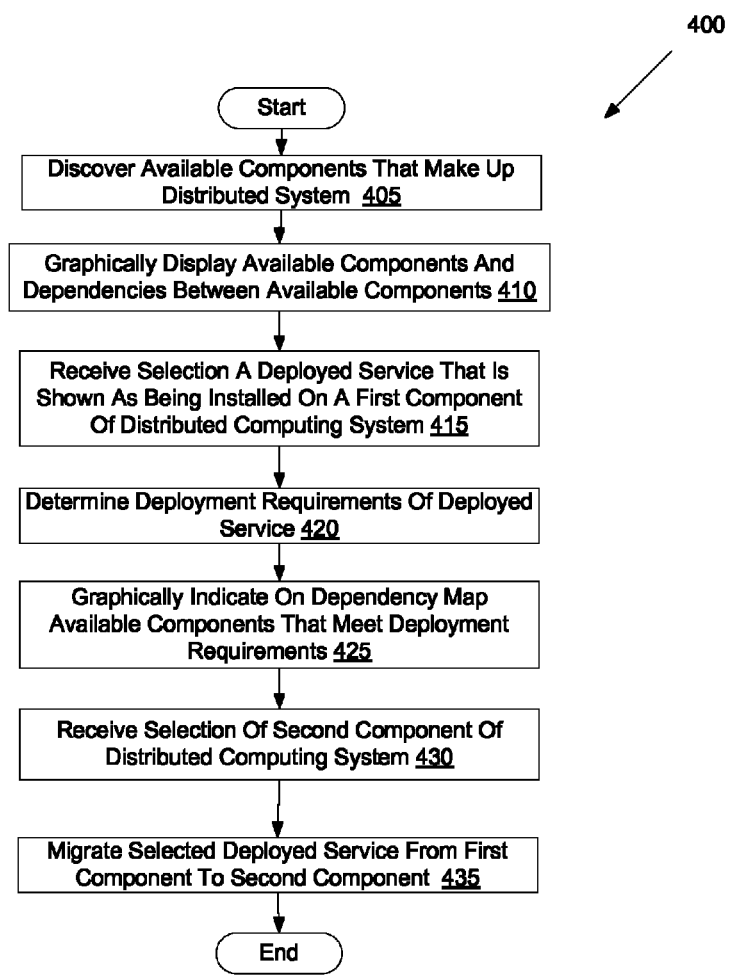
FIG. 4 illustrates a flow diagram of another embodiment for a method of managing dependencies in a distributed computing system.

FIG. 4 illustrates a flow diagram of another embodiment for a method 400 of managing dependencies in a distributed computing system. The method is performed by processing logic that comprises hardware (e.g., circuitry, dedicated logic, programmable logic, microcode, etc.), software (such as instructions run on a processing device), or a combination thereof. In one embodiment, method 400 is performed by graphical user interface 172 and/or system manager 107 of distributed computing system 100 of FIG. 1.

Referring to FIG. 4, at block 405 available components of a distributed computing system are discovered. At block 410, a graphical user interface graphically displays available components and dependencies between available components. In one embodiment, the available components and relationships between the available components are shown via a map.

At block 415, a selection of a deployed service is received via the graphical user interface. At block 420, requirements of the selected deployed service (e.g., system requirements, software dependency requirements, etc.) are determined. At block 425, the graphical user interface graphically indicates on the dependency map available components that meet the deployment requirements.

At block 430, a selection of an available component (other than an available component on which the selected deployed service is currently deployed) is received via the graphical user interface. Selection of the deployed service and of the available component may be received via a mouse command. For example, a user may click on a deployed service and drag it to an available component.

At block 435, the selected deployed service is migrated to the selected available component. Migration may include packaging up the deployed service, copying the package to the selected available component and installing the package on the selected available component. Migration may also include deleting the deployed service from an available component on which it was originally located.

Figure 5:
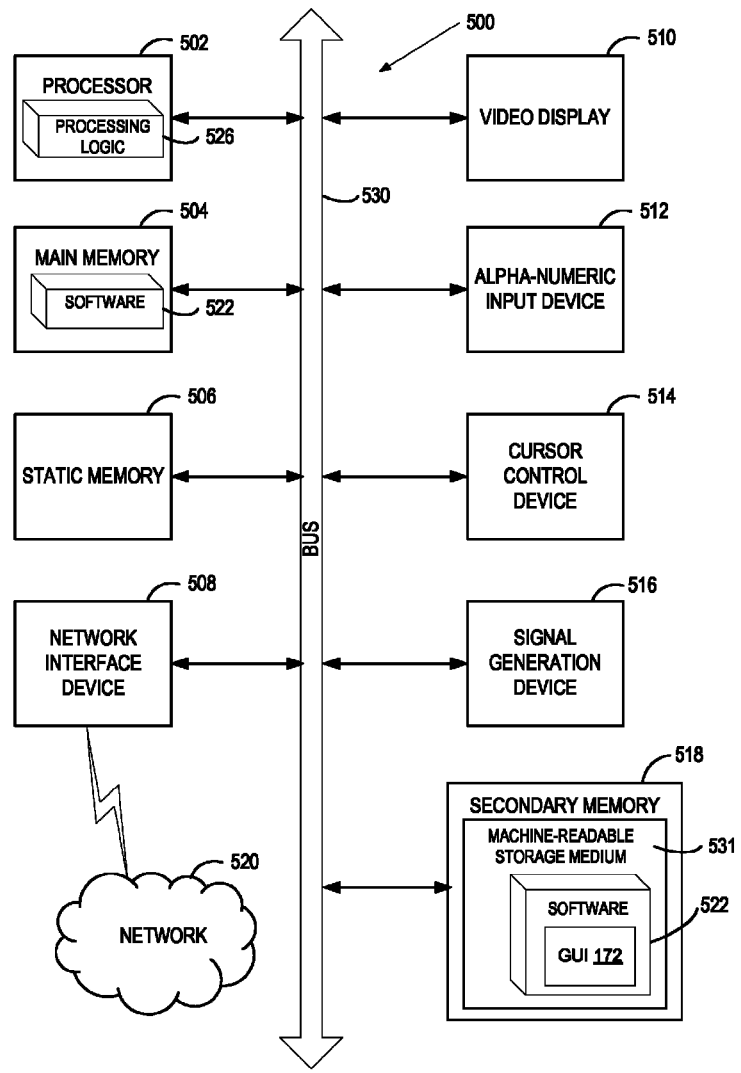
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store a graphical user interface 172 and/or system manager 107 of FIG. 1), and/or a software library containing methods that call a graphical user interface 172 or system manager 107. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method, comprising:
    discovering a plurality of available components that make up a distributed computing system, the plurality of available components comprising available hardware components and available software components that operate on the available hardware components;

graphically displaying the plurality of available components and dependencies between the plurality of available components in a map of the distributed computing system;

graphically displaying a plurality of undeployed services;

receiving, by a processor executing a system manager, a selection of an undeployed service of the plurality of undeployed services;

determining a deployment criterion of the selected undeployed service and graphically indicating one or more available components of the plurality of available components that satisfy the deployment criterion;

receiving a selection of an available component from the one or more available components that satisfy the deployment criterion;

determining, by the processor, without user input, whether the selected undeployed service depends on any additional services that have not been deployed to the selected available component;

in response to determining that the selected undeployed service depends on an additional service that has not been deployed to the selected available component, deploying the additional service to the selected available component; and deploying the selected undeployed service to the selected available component.

2. The method of claim 1, further comprising:
in response to receiving the selection of the available component, graphically displaying additional information about the selected available component.

3. The method of claim 1, wherein each of the plurality of undeployed services and each of the plurality of available components are represented in the graphical user interface by a distinct icon, the method further comprising:
receiving a mouse command to drag an icon representation of the selected undeployed service to an icon representation of the selected available component, wherein the mouse command initiates the deploying.

4. The method of claim 1, wherein discovering the plurality of available components comprises receiving information pertaining to the plurality of available components from at least one of the plurality of available components or a registry.

5. The method of claim 1, further comprising:
receiving a selection of a deployed service that is graphically shown as being installed on a first component of the distributed computing system;
receiving a selection of a second component of the distributed computing system; and
moving the deployed service from the first component to the second component.

6. The method of claim 1, wherein determining whether the selected undeployed service depends on any additional services that have not been deployed to the selected available component is performed based on dependency data gathered from previously deployed services.

7. The method of claim 1, wherein receiving the selection of the undeployed service comprises receiving a selection of at least two undeployed services and receiving the selection of the available component comprises receiving a selection of at least two available components.

8. A non-transitory computer readable medium comprising instructions that, when executed by a processor, cause the processor to perform operations comprising:

discovering a plurality of available components that make up a distributed computing system, the plurality of available components comprising available hardware components and available software components that operate on the available hardware components;

graphically displaying the plurality of available components and dependencies between the plurality of available components in a map of the distributed computing system;

graphically displaying a plurality of undeployed services;

receiving, by the processor, a selection of an undeployed service of the plurality of undeployed services;

determining a deployment criterion of the selected undeployed service and graphically indicating one or more available components of the plurality of available components that satisfy the deployment criterion;

receiving a selection of an available component from the one or more available components that satisfy the deployment criterion;

determining, by the processor, without user input, whether the selected undeployed service depends on any additional services that have not been deployed to the selected available component;

in response to determining that the selected undeployed service depends on an additional service that has not been deployed to the selected available component, deploying the additional service to the selected available component; and deploying the selected undeployed service to the selected available component.

9. The non-transitory computer readable medium of claim 8, the operations further comprising:
in response to receiving the selection of the available component, graphically displaying additional information about the selected available component.

10. The non-transitory computer readable medium of claim 8, wherein each of the plurality of undeployed services and each of the plurality of available components are represented in the graphical user interface by a distinct icon, the operations further comprising:
receiving a mouse command to drag an icon representation of the selected undeployed service to an icon representation of the selected available component, wherein the mouse command initiates the deploying.

11. The non-transitory computer readable medium of claim 8, wherein discovering the plurality of available components comprises receiving information pertaining to the plurality of available components from at least one of the plurality of available components or a registry.

12. The non-transitory computer readable medium of claim 8, the operations further comprising:
receiving a selection of a deployed service that is graphically shown as being installed on a first component of the distributed computing system;
receiving a selection of a second component of the distributed computing system; and
moving the deployed service from the first component to the second component.

13. The non-transitory computer readable medium of claim 8, wherein receiving the selection of the undeployed service comprises receiving a selection of at least two undeployed services and receiving the selection of the available component comprises receiving a selection of at least two available components.

14. A computing apparatus that is a component of a distributed computing system, comprising:

a memory comprising instructions for deploying services; and a processor, connected with the memory, to execute the instructions, wherein the instructions cause the processor to:

discover a plurality of available components that make up a distributed computing system, the plurality of available components comprising available hardware components and available software components that operate on the available hardware components;

graphically display the plurality of available components and dependencies between the plurality of available components in a map of the distributed computing system;

graphically display a plurality of undeployed services;

receive a selection of an undeployed service of the plurality of undeployed services;

determine a deployment criterion of the selected undeployed service and graphically indicate one or more available components of the plurality of available components that satisfy the deployment criterion;

receive a selection of an available component from the one or more available components that satisfy the deployment criterion;

determine, without user input, whether the selected undeployed service depends on any additional services that have not been deployed to the selected available component;

deploy the additional service to the selected available component in response to determining that the selected undeployed service depends on an additional service that has not been deployed to the selected available component; and deploy the selected undeployed service to the selected available component.

15. The computing apparatus of claim 14, processor further to, in response to receiving the selection of the available component, graphically display additional information about the selected available component.

16. The computing apparatus of claim 14, wherein each of the plurality of undeployed services and each of the plurality of available components are represented in the graphical user interface by a distinct icon, the processor further to receive a mouse command to drag an icon representation of the selected undeployed service to an icon representation of the selected available component, wherein the mouse command initiates the deploying.

17. The computing apparatus of claim 14, wherein discovering the plurality of available components comprises receiving information pertaining to the plurality of available components from at least one of the plurality of available components or a registry.

18. The computing apparatus of claim 14, the processor further to receive a selection of a deployed service that is graphically shown as being installed on a first component of the distributed computing system, receive a selection of a second component of the distributed computing system, and move the deployed service from the first component to the second component.

* * * * *